United States Patent [19]

Weitemeyer et al.

[11] Patent Number: 5,260,402
[45] Date of Patent: Nov. 9, 1993

[54] CURABLE ORGANOPOLYSILOXANES WITH OXYALKYLENE ETHER GROUPS LINKED THROUGH SIOC GROUPS, THEIR SYNTHESIS AND USE

[75] Inventors: Christian Weitemeyer; Hardi Döhler, both of Essen, Fed. Rep. of Germany

[73] Assignee: Th. Goldschmidt AG, Essen, Fed. Rep. of Germany

[21] Appl. No.: 904,749

[22] Filed: Jun. 25, 1992

Related U.S. Application Data

[63] Continuation-in-part of Ser. No. 700,492, May 15, 1991, abandoned.

[30] Foreign Application Priority Data

Jun. 21, 1990 [DE] Fed. Rep. of Germany ....... 4019711

[51] Int. Cl.$^5$ .............................................. C08G 77/14
[52] U.S. Cl. ........................................ 528/29; 528/31; 522/99; 428/447
[58] Field of Search ...................... 528/29, 31; 522/99; 428/447

[56] References Cited

U.S. PATENT DOCUMENTS

| | | | |
|---|---|---|---|
| 4,311,821 | 1/1982 | Weitemeyer et al. | 528/15 |
| 4,906,721 | 3/1990 | Weitemeyer et al. | 528/29 |
| 5,026,810 | 6/1991 | Liu | 528/14 |
| 5,145,915 | 9/1992 | Weitemeyer et al. | 525/403 |

*Primary Examiner*—John C. Bleutge
*Assistant Examiner*—Margaret W. Glass
*Attorney, Agent, or Firm*—Anderson Kill Olick & Oshinsky

[57] ABSTRACT

Curable organopolysiloxanes are disclosed which contain oxyalkylene ether groups linked through SiOC groups; the oxyalkylene ether groups have the formula

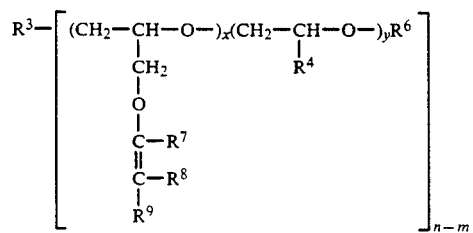

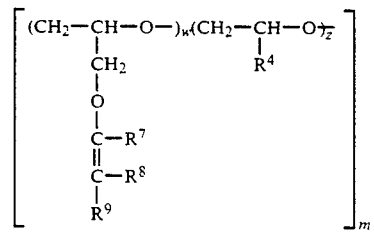

A method for the synthesis of these compounds, as well as their use as casting compositions, adhesive coating agents and modifying additives for compounds which can be cured cationically, by free radicals, or by high-energy radiation are also disclosed.

21 Claims, No Drawings

CURABLE ORGANOPOLYSILOXANES WITH OXYALKYLENE ETHER GROUPS LINKED THROUGH SIOC GROUPS, THEIR SYNTHESIS AND USE

BACKGROUND OF THE INVENTION

This is a continuation-in-part of copending application Ser. No. 07/700,492, filed May 15, 1991, now abandoned.

This invention is directed to curable polysiloxanes having oxyalkylene ether groups linked through SiOC groups, and more particularly to curable polysiloxanes having oxyalkylene vinyl ether groups linked through SiOC groups and wherein the vinyl groups can be substituted by alkyl groups. The invention is directed also to a method for the synthesis of these compounds and to their use preferably as photochemically curable polysiloxanes in casting compositions and also as abhesive coating materials for two-dimensional supports and as modifying additives in compounds curable cationically, by free radical reactions, or by UV or electron beams.

Aside from systems that polymerize by a free radical mechanism under the action of UV, cationically curable systems containing epoxy or vinyl ether compounds have been developed in recent years. Curing of the latter systems is initiated particularly by diaryl iodonium salts and triaryl sulfonium salts. The advantage of cationically curable systems lies in the insensitivity of the curing reactions with respect to the effects of oxygen in the air, in the rapid hardening of the film and in the low ecological impact of these systems.

UV curing systems based on epoxy functional organopolysiloxanes are described in numerous patents, of which U.S. Pat. No. 4,421,904 is an example. A comprehensive account is given in the journal, *Adhesive Age*, 1989, pp. 24–27. Conventional epoxy group-containing siloxanes for the abhesive coating of 2-dimensional supports are described in this publication.

Catalysts with a low acid strength are adequate for the cationic polymerization of optionally substituted, vinyl ether group containing compounds. Therefore, contrary to what is possible with compounds containing epoxide groups, ketosulfones, which are not salt-like, can also be used as photoinitiators in addition to the conventional, salt-like diaryl iodonium and triaryl sulfonium compounds.

Photo-curable, vinyl ether group containing organopolysiloxanes are described in U.S. Pat. No. 4,617,238. In this patent, a method is described for which the vinyl ether group is introduced into the organopolysiloxane by the addition reaction (hydrosilylation) of compounds having an allyl ether and a vinyl ether group with an SiH group of an organopolysiloxane. During this reaction, the allyl group adds on to the SiH group, while the vinyl ether group is retained. It follows from this that only one vinyl ether group per SiH group can be incorporated in the siloxane.

SUMMARY OF THE INVENTION

An object of the present invention is to provide curable organo-polysiloxanes which contain oxyalkylene ether groups linked through SiOC groups.

Another object of the invention is to provide curable organo-polysiloxanes wherein the curing and cross linking properties can be controlled within wide limits.

Still another object of the invention is to provide a method which is easy to carry out for the synthesis of curable organopolysiloxanes having a desired number of optionally substituted vinyl ether groups, without restriction as to the number of SiH groups present in the starting material.

A further object of the invention is to provide a method for the synthesis of curable organopolysiloxanes having a desired number of optionally substituted vinyl ether groups, without restriction as to the number of SiH groups present in the starting material and as far as possible, without use of toxic reactants, such as chloroethyl vinyl ether.

Another object of the invention is to provide organopolysiloxanes which are useful as photochemically curable polysiloxane in casting compositions, as abhesive coating material and as modifying additives on compositions curable cationically, by free radical reaction, or by UV or electron beams.

By means of the present invention the technical problem of preparing organopolysiloxanes which have an arbitrary number of optionally substituted vinyl ether groups, without being restricted to the number of SiH groups present in the starting material has been solved and as a result, it has also become possible to affect and control the curing and cross linking properties within wide limits.

Organopolysiloxanes have been discovered which can contain variable amounts of optionally substituted vinyl ether groups. The organopolysiloxanes of the invention, which contain oxyalkylene ether groups linked through SiOC groups, have the average formula

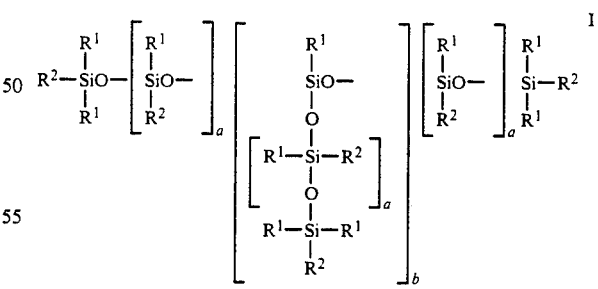

wherein
$R^1$ is the same or different in the molecule and represent an alkyl group with 1 to 4 carbon atoms or a phenyl group, with the proviso that at least 90% of the $R^1$ groups are methyl groups
$R^2$ is the same or different in the molecule and represents an alkyl group with 1 to 20 carbon atoms, an aryl group, aralkyl group or an oxyalkylene ether group of the formula

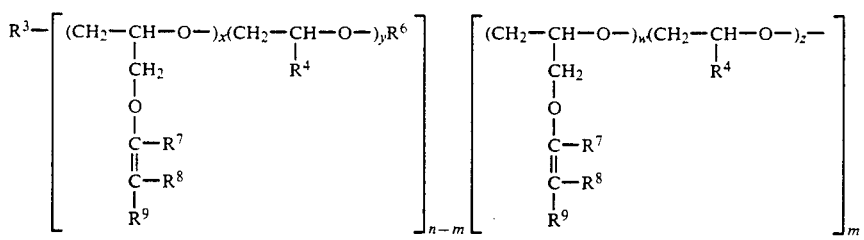

wherein
R³ is an n-valent group derived from a compound (R³)H$_n$ with n active hydrogen atoms, the compound (R³)H$_n$ is selected from a member of the group consisting of water, ammonia, a monohydric or polyhydric alcohol, a monohydric or polyhydric phenol, a monocarboxylic or polycarboxylic acid, a hydroxycarboxylic acid, and a monoamine or a polyamine,
R⁴ is a hydrogen, hydrocarbon or R⁵OCH₂—group,
R⁵ is hydrogen, a hydrocarbon or acyl group,
R⁶ is a hydrocarbon or acyl group,
R⁷, R⁸, R⁹ are each a hydrogen group with 1 to 8 carbon atoms or
R⁷ and R⁸ or R⁸ and R⁹ can be linked together to form a cyclic, non-aromatic hydrocarbon group with 5 or 6 carbon atoms,
n is a number from 1 to 6,
m has an average value of 1 to 2, provided m≥n,
x, y, w, z each have a value of 0 to 100, with the proviso that w+z≧1 and the sum [x(n−m)+w.m] is >1,
with the further proviso that in the average molecule at least one R² group is an oxyalkylene ether group as defined above,
a has an average value of 1 to 1,000 and
b has an average value of 0 to 10.

Also according to the invention, the new organopolysiloxanes are synthesized by reaction of a polyoxyalkylene ether of the formula

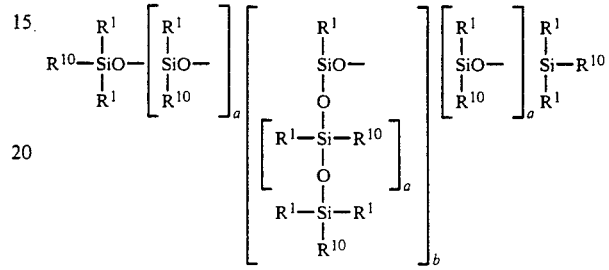

wherein
R¹, a and b have the same meanings or values already given and the groups R¹⁰ are the same or different and represent alkyl groups with 1 to 20 carbon atoms, aryl groups, aralkyl groups or reactive groups, which react with —COH groups with the formation of SiOC groups and is selected from a member of the group consisting of —OH, —OR¹¹, —Cl, —H, and OCOR¹², wherein R¹¹ and R¹² are alkyl groups with 1 to 4 carbon atoms,
with the proviso that in the average molecule at least one R¹⁰ group is a reactive group.

DESCRIPTION OF THE INVENTION

In the organopolysiloxanes of the invention, the R¹ groups can be the same or different in the molecule and are alkyl groups with 1 to 4 carbon atoms or phenyl groups. The alkyl groups can be methyl, ethyl, propyl or butyl groups. However, the condition must be fulfilled that, in the average molecule, at least 90% of the R¹ groups are methyl groups. Particularly preferred are organopolysiloxanes in which all the R¹ groups are methyl groups. To influence the abhesive properties it may, however, also be of advantage if up to 10% of the R¹ groups are phenyl groups.

The R² groups, like the R¹ groups, can be the same or different in the molecule. They can be alkyl groups with 1 to 20 carbon atoms, aryl or aralkyl groups or oxyalkylene ether groups of the general formula II. However, the condition must be fulfilled that at least one oxyalkylene ether group of the formula II

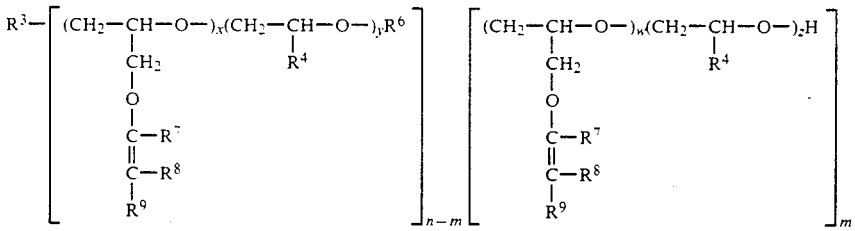

wherein R³, R⁴, R⁵, R⁶, R⁷, R⁸, R⁹, n, m, x, y, w and z have the meanings or values already given, and the organopolysiloxane is of the average formula

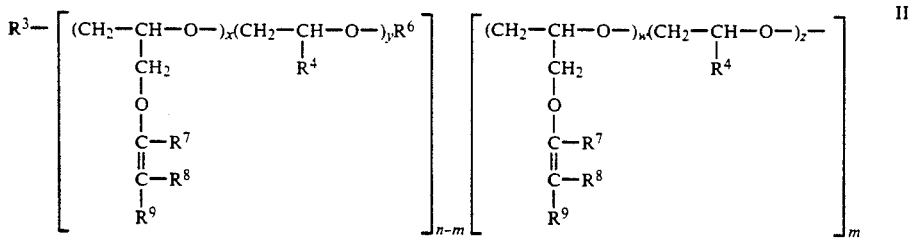

must be present in the average organopolysiloxane molecule. Preferably, 1 to 30 and particularly 2 to 15 oxyalkylene ether groups should be contained in the average organopolysiloxane molecule.

When the $R^2$ group represents an alkyl group with 1 to 20 carbon atoms, it can assume the same meaning as the $R^1$ group. It can, however, also have more than 4 carbon atoms and be linear or branched. Examples of such groups are the octyl, iso-octyl, nonyl, decyl, dodecyl and hexadecyl groups. The alkyl groups may be substituted.

When $R^2$ represents an aryl group, the phenyl group is particularly preferred. Further examples of aryl groups are the tolyl and xylyl groups.

Phenylethyl and 2-phenylpropyl groups are preferred as aralkyl groups.

The inventive, curable organopolysiloxane is characterized in particular by oxyalkylene ether groups of the formula II

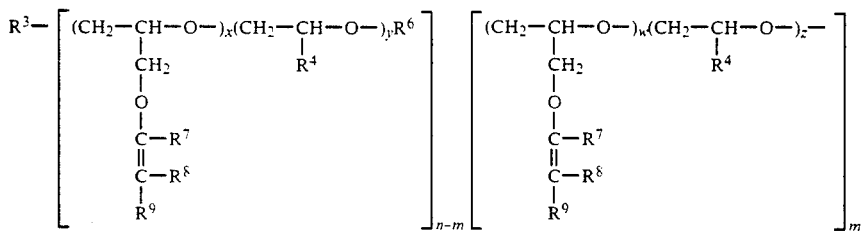

wherein
$R^3$ is an n-valent group derived from a compound $(R^3)H_n$ with n active hydrogen atoms, the compound $(R^3)H_n$ is selected from a member of the group consisting of water, ammonia, a monohydric or polyhydric alcohol, a monohydric or polyhydric phenol, a monocarboxylic or polycarboxylic acid, a hydroxycarboxylic acid, and a monoamine or a polyamine.

In $R^3$, saturated alcohols with 1 to 13 carbon atoms are preferred as monohydric alcohols; examples of these are methanol, ethanol, propanol, hexanol, decanol and tridecyl alcohol. Further, for monohydric unsaturated alcohols with 3 to 13 carbon atoms, allyl alcohol, methallyl alcohol, oleyl alcohol and 5-hexane-1-ol are preferred. Also particularly suitable as the dihydric to hexahydric aliphatic alcohols with 2 to 6 carbon atoms are ethylene glycol, propylene glycol, glycerin, pentaerythritol and sorbitol.

Examples of hydroxycarboxylic acids are citric acid and lactic acid. As monohydric to trihydric phenols, phenol and hydroquinone are particularly suitable. Examples of suitable monohydric or polyhydric carboxylic cids are acetic acid, butyric acid, adipic acid, succinic acid and phthalic acid.

Suitable amines are the low molecular weight amines, such as methylamine, ethylamine, propylenediamine and ethylenediamine.

The following Table is intended to illustrate the meaning of $R^3$ in greater detail.

TABLE 1

| $(R^3)H_n$ | $R^3-$ | n |
|---|---|---|
| $CH_3CH_2CH_2OH$ | $CH_3CH_2CH_2O-$ | 1 |
| $CH_3CH_2COOH$ | $CH_3CH_2COO-$ | 1 |
| $\begin{array}{c}CH_2OH\\ \mid \\ CHOH\\ \mid \\ CH_2OH\end{array}$ | $\begin{array}{c}CH_2O-\\ \mid \\ CHO-\\ \mid \\ CH_2O-\end{array}$ | 3 |
| $HO(CH_2)_pCOOH$ | $OO(CH_2)_pCOO-$ | 2 |
| $\begin{array}{c}\text{Alkyl}\\ \diagdown\\ N-H\\ \diagup\\ \text{Alkyl}\end{array}$ | $\begin{array}{c}\text{Alkyl}\\ \diagdown\\ N-\\ \diagup\\ \text{Alkyl}\end{array}$ | 1 |
| $H_2O$ | $\diagup O \diagdown$ | 2 |

It can be seen from these examples that the structure of $R^3$ is variable within wide limits.

$R^4$ is a hydrogen, alkyl or $R^5OCH_2$ group. This group also can have different meanings within the polymeric molecule. As an alkyl group, $R^4$ can have, in particular, 1 to 12 carbon atoms. Preferably, $R^4$ is a hydrogen, methyl, ethyl, $HOCH_2-$ or $CH_3OCH_2-$ group.

The $R^5$ group is a hydrogen, alkyl or acyl group. As an alkyl group, a low molecular weight alkyl group with 1 to 4 carbon atoms is particularly preferred. As an acyl group, a group with 2 to 7 carbon atoms is suitable. The acetyl group is preferred.

The $R^6$ group is an alkyl or acyl group. Preferably, $R^6$ is a low molecular weight alkyl group with 1 to 4 carbon atoms or the acetyl group.

The $R^7$, $R^8$ and $R^9$ groups are hydrogen or alkyl groups. The $R^7$ and $R^8$ or the $R^8$ and $R^9$ groups can be linked to form a cyclic, non-aromatic hydrocarbon group with 5 or 6 carbon atoms. Examples are

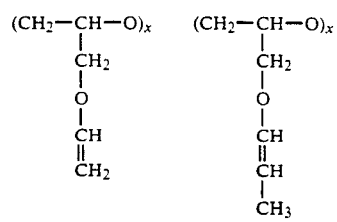

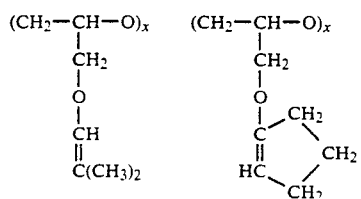

Preferably, at least one of the $R^7$, $R^8$ and $R^9$ groups is an alkyl group. It is particularly preferred, when the $R^8$ group and/or the $R^9$ group is an alkyl group, preferably a methyl group, the $R^7$ group is a hydrogen group. It is also preferred if $R^7$ and $R^8$ are the common constituents of a cyclic, non-aromatic hydrocarbon group with 5 or 6 carbon atoms, $R^9$ is a hydrogen group.

If the $R^8$ and $R^9$ groups are different, the possibility of the formation of cis- and transisomeric compounds exists. Within the sense of the invention, however, both forms are usable.

The subscript n has a value of 1 to 6, while m has a value of 1 to 2 and preferably is 1. On the other hand, m must not be greater than n and, preferably, n=m.

The subscripts x, y, w and z each have an average value of 0 to 100, with the proviso that $w+z \geq 1$, $x+z \geq 1$ and the sum $[x(n-m)+w.m]$ is $>1$. Preferably, $x+w$ has a value of 1 to 25 and, particularly, a value of 2 to 4. Preferably $1 < x+y+w+z < 150$. Due to these conditions, it is made certain that, in the oxyalkylene ether group, more than one group of the formula

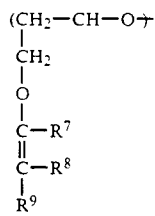

is present. This in turn has the consequence that contrary to the compounds of U.S. Pat. Nos. 4,617,238 and 4,906,721 in which per linking Si-Atom only one polymerizable group can be introduced, in the present inventive com-pound, up to $[x(n-m)+w.m]$ numbers of polymerizable groups per linking Si-atom can be introduced.

The subscripts a and b characterize the structure of the polysiloxane, a being defined as the number of difunctional Si units and having a value of 1 to 1,000, while b indicates the number of trifunctional units and has a value of 0 to 10. Preferably, a has a value of 5 to 200 and b a value of 0 to 2. The value of b=0 is particularly preferred.

Examples of compounds of Formula I are:

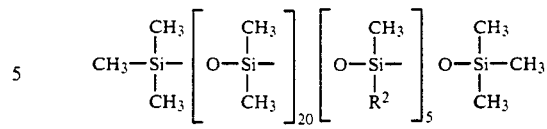

where $R^2 =$

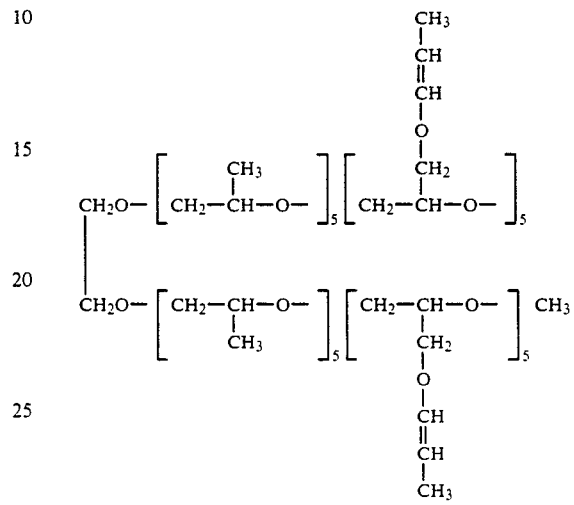

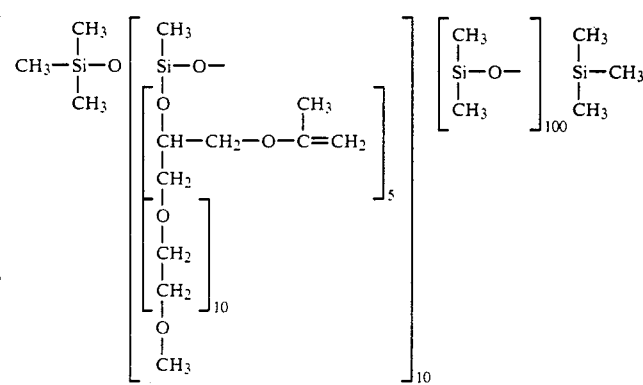

and

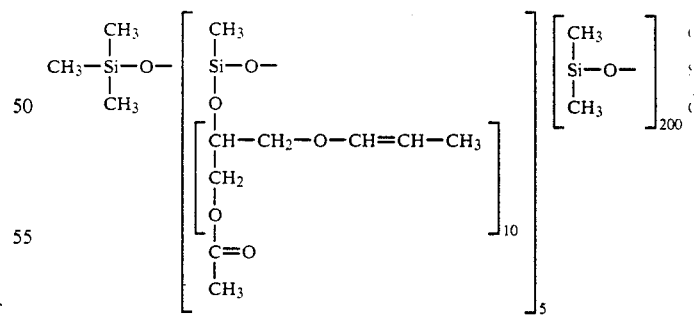

With reference to method of the synthesis of the organopolysiloxanes, which are modified according to the invention by reaction of a polyoxyalkylene of formula II with an organopolysiloxane of formula IV, when $R^{10}$ of the organopolysiloxane represents alkyl groups with 1 to 20 carbon atoms, aryl groups or aralkyl groups, $R^{10}$ corresponds to the $R^2$ group. In the average molecule, however, at least one $R^{10}$ corresponds to the $R^2$ group. In the average molecule, however, at least one R[10] group must be a reactive group. Preferably, in the average molecule, 1 to 30 and particularly 2 to 15 R[10] groups are reactive groups. Reactive groups are those which react with a —COH group to form an SiOC group.

Preferred reactive groups which are linked to silicon are —OH, —OR[11], —Cl, —H or —OCOCR[12] groups, R[11] and R[12] each being an alkyl group with 1 to 4 carbon atoms.

The reaction of the polyoxyalkylene ether of formula II and the organopolysiloxanes of formula IV is carried out preferably in the presence of a catalyst, such as a tin or titanium ester or an alkali fluoride or in the presence of an acid acceptor, such as an amine, in the presence of a solvent and at a temperature ranging from 25° to 170° C. and, particularly, from 50° to 150° C. Suitable solvents are aromatic hydrocarbons, such as toluene and hexane and diglycol dimethyl ether.

A further aspect of the invention is the use of the organopolysiloxanes, which have been modified pursuant to the invention, preferably as photochemically curable polysiloxane in casting compositions, as abhesive coating materials for two-dimensional supports or as a modifying additive in compounds which can be curred by free radicals, cationically or by UV or electron beam radiation.

Curing of the inventive compounds is accomplished preferably by UV radiation in the presence of catalysts, such as saline diaryl iodonium or triaryl sulfonium compounds or non-saline compounds, such as ketosulfones. Examples of such compounds are

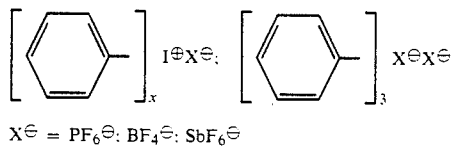

$X^\ominus = PF_6^\ominus; BF_4^\ominus; SbF_6^\ominus$

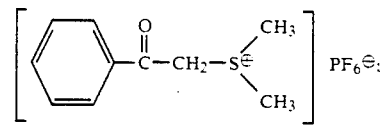

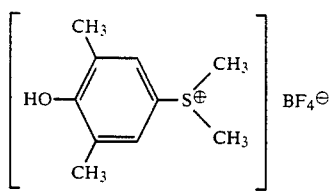

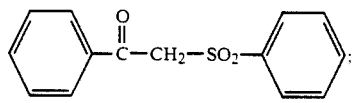

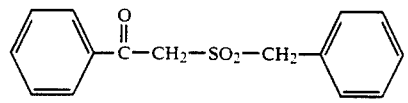

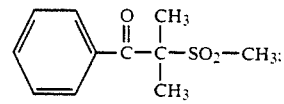

-continued

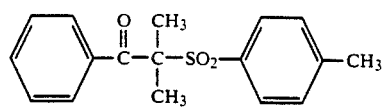

The inventive compounds cure in a very short time (fractions of a second up to a few seconds) to tack-free, flexible or hard products. Compared to known compounds of the state of the art, they have the advantage that practically any number of optionally substituted vinyl groups can be disposed along the chain of the polymeric molecule. By these means, the curing rate and the cross linking density can be adapted to the requirements arising with the respective use.

For use, the compounds can be mixed with conventional additives, modifiers, pigments, fillers, flame retardants and the like.

The curable compositions can be applied on substrates such as metal, rubber, plastic, molded parts or films, paper, wood, glass fabric, cement, ceramic, etc.

Some of the applications in which the curable compositions of the present invention can be used are protective, decorative and insulating coatings, compositions for embedding, printing ink shades, sealers, adhesives, photoresist lacquers, wire insulation, textile coatings, laminated plastics, impregnated tapes, pressure plate, printing plates, etc.

In the following examples, which illustrate the best mode currently contemplated for carrying out the invention, the preferred synthetic methods are explained in greater detail and the properties of the inventive compounds are shown through application-related experiments. However, the illustrative examples must not be construed as limiting the invention in any manner.

EXAMPLE 1

To a stirred vessel are added 730 g (5 moles) of a compound, which according to $^1$H-NMR has the formula

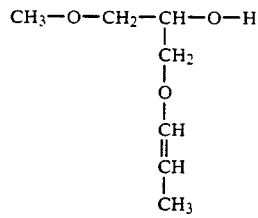

and 27 g of potassium fluoride (1% by weight) and 1942 g (1 mole) of a siloxane of the average formula

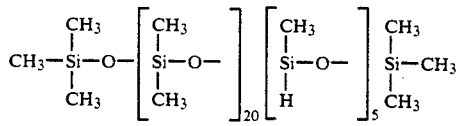

are added dropwise at 120° C., over a period of 2 hours. The reaction mixture is stirred at 100° C. with a solution of 5% sodium butylate in butanol until hydrogen is no longer evolved. The product is distilled under reduced pressure up to 100° C. A total of 2529 g (95% of the theoretical yield) of a slightly yellowish, moderately viscous product are obtained, which according to $^1$H-NMR has the average formula

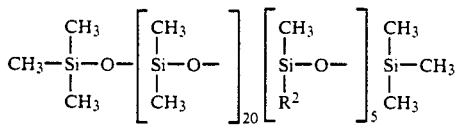

with R$^2$ = CH$_3$—O—CH$_2$—CH—O—
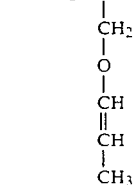

EXAMPLE 2

To a stirred vessel are added 586 g (0.05 moles) of a compound, which according to $^1$H-NMR has the average formula

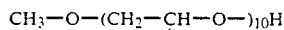
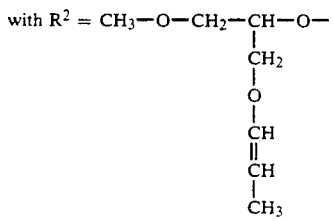

and 21 g of potassium fluoride (1% by weight) and 1526 g (0.1 moles) of a siloxane having the average formula

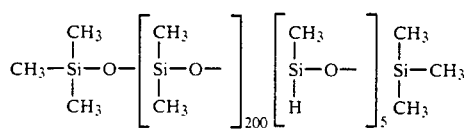

are added dropwise at 120° C. over a period of 2 hours. The reaction mixture is stirred at 100° C. with a solution of 5% sodium butylate in butanol until hydrogen is no longer evolved. The product is distilled under reduced pressure up to 100° C. A total of 1900 g (90% of the theoretical yield) of a slightly yellowish, moderately viscous product are obtained, which according to $^1$H-NMR has the average formula

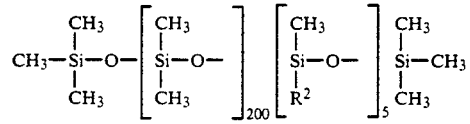

with R$^2$ = CH$_3$—O—(CH$_2$—CH—O—)$_{10}$—
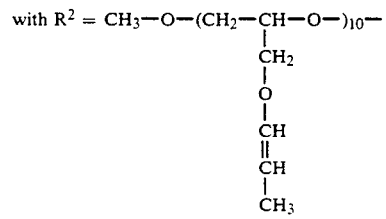

EXAMPLE 3

To a stirred vessel are added 1592 g (0.3 moles) of a compound, which according to $^1$H-NMR has the average formula

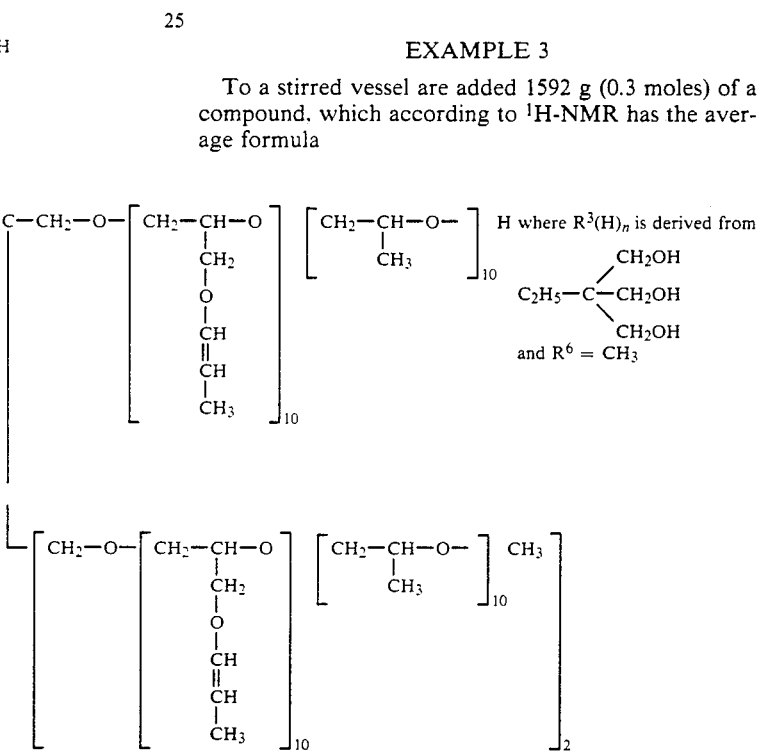

and 38 g of potassium fluoride (1% by weight) and 2254 g (0.1 moles) of a siloxane having the average formula

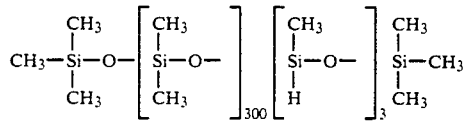

are added dropwise at 120° C. over a period of 2 hours. The reaction mixture is stirred at 100° C. with a solution of 5% sodium butylate in butanol until hydrogen is no longer evolved. The product is distilled under reduced pressure up to 100° C. A total of 1900 g (90% of the theoretical yield) of a slightly yellowish, moderately viscous product are obtained, which according to $^1$H-NMR has the average formula

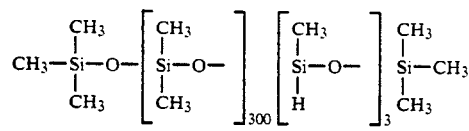

with R$^2$

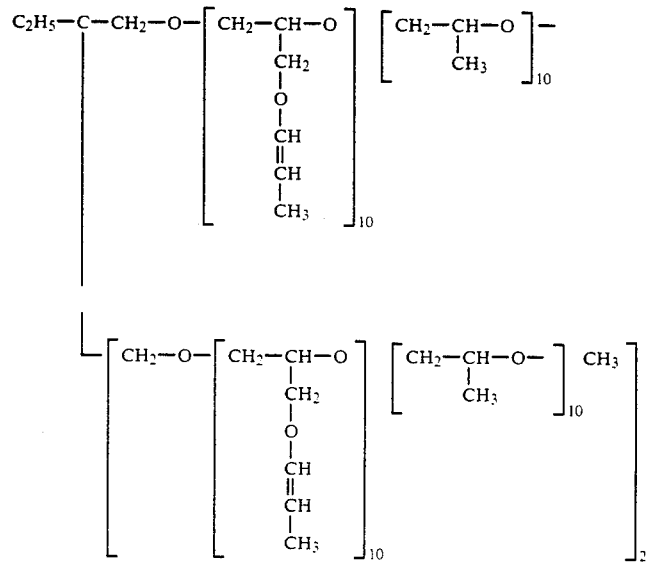

EXAMPLE 4

To a stirred vessel are added 1888 g (1 mole) of a compound which, according to $^1$H-NMR, has the formula

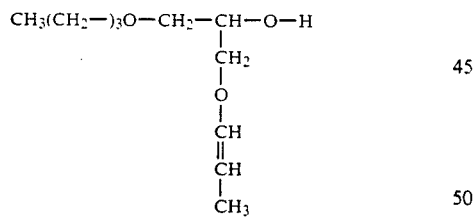

and 101 g (1 mole) of triethylamine and 500 g of toluene and 851 g (0.1 moles) of a siloxane having the average formula

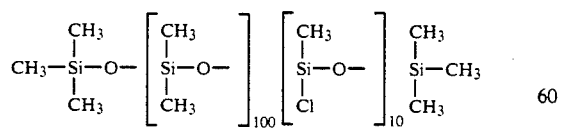

are added drop wise at 120° C. over a period of 2 hours. After filtration, the product is distilled under reduced pressure up to 100° C. A total of 852 g (85% of the theoretical yeild) of a slightly yellowish, moderately viscous product are obtained which, according to $^1$H-NMR, has the average formula

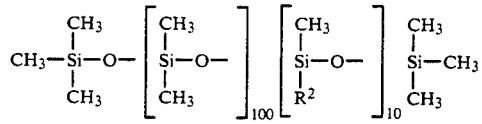

with R$^2$ = 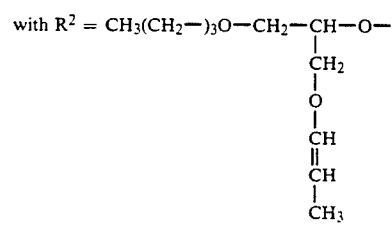

EXAMPLE 5

To a stirred vessel are added 1234 g (0.5 moles) of a compound which, according to $^1$H-NMR, has the average formula

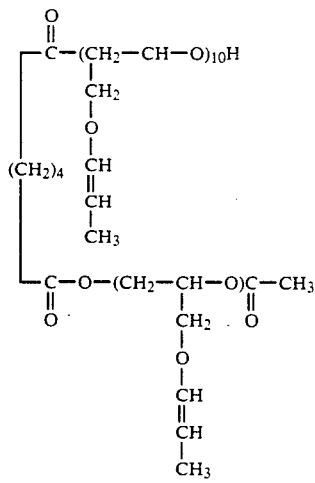

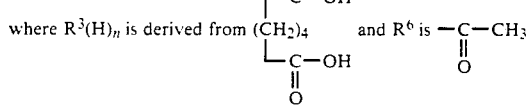

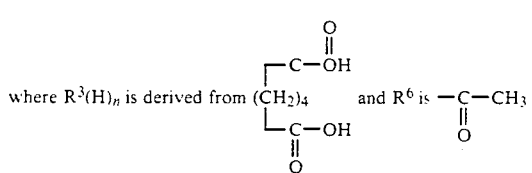

and 27 g of potassium floride (1% by weight) and 1526 g (0.1 moles) of a siloxane having the average formula

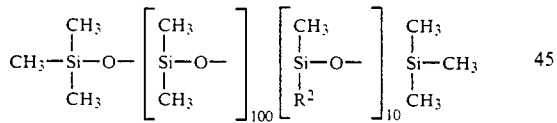

are added dropwise at 120° C. over a period of 2 hours. The reaction mixture is stirred at 100° C. with a solution of 5% sodium butylate in butanol until hydrogen is no longer evolved. The product is distilled under reduced pressure up to 100° C. A total of 2483 g (90% of the theoretical yield) of a slightly yellowish, moderately viscous product are obtained which, according to $^1$H-NMR, has the average formula

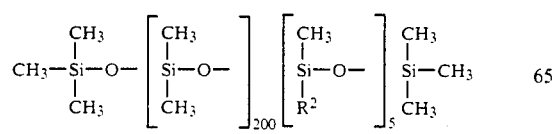

-continued

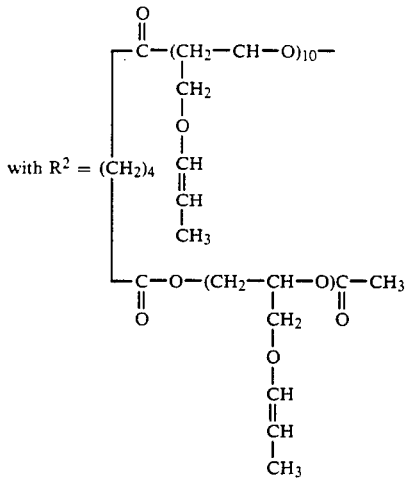

EXAMPLE 6

To a stirred vessel are added 1548 g (0.1 moles) of a compound having the average formula

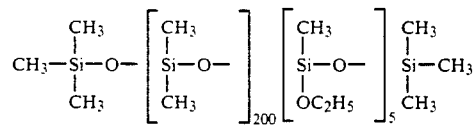

and 11 g of butyl titanate (0.5% by weight) and 649.5 g (0.5 moles) of a compound which, according to $^1$H-NMR, has the average formula

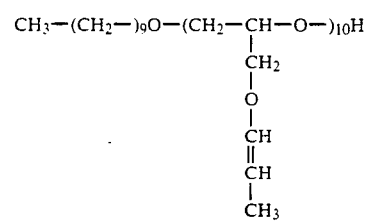

are added dropwise. The reaction mixture is refluxed and ethanol is distilled off until the refluxing abates. The product is distilled under reduced pressure up to 100° C. A total of 2022 g (93% of the theoretical yield) of a slightly yellowish, moderately viscous product are obtained which, according to $^1$H-NMR, has the average formula

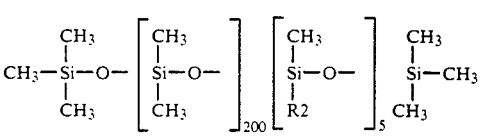

-continued with R² = 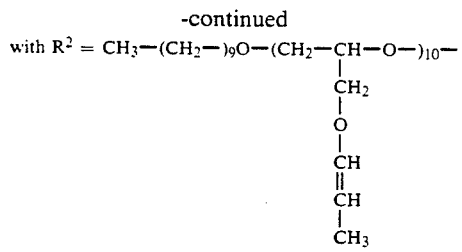

EXAMPLE 7

To a stirred vessel are added 1178 g (0.5 moles) of a compound which, according to ¹H-NMR, has the average formula

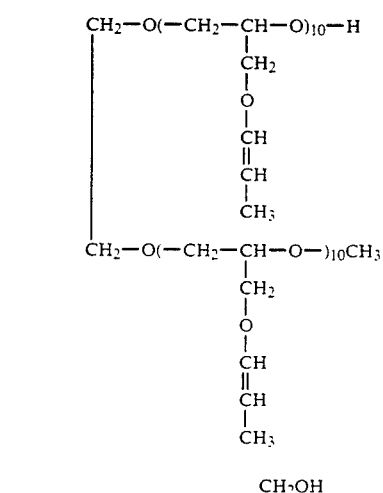

where R³(H)$_n$ is derived from CH$_2$OH and R⁶ = CH$_3$ and 23 g of potassium fluoride (1% by weight) and 1156 g (0.1 moles) of a siloxane having the average formula

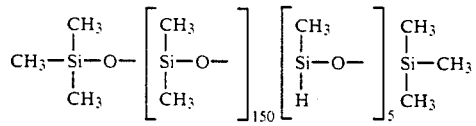

are added dropwise at 120° C. over a period of 2 hours. The reaction mixture is stirred at 100° C. until hydrogen is no longer evolved with a solution of 5% sodium butylate in butanol. The product is distilled under reduced pressure up to 100° C. A total of 2100 g (90% of the theoretical yield) of a slightly yellowish, moderately viscous product are obtained which, according to ¹H-NMR, has the average formula

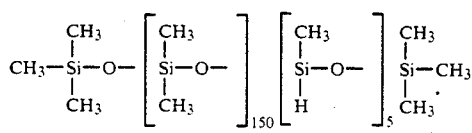

with

R² =

-continued

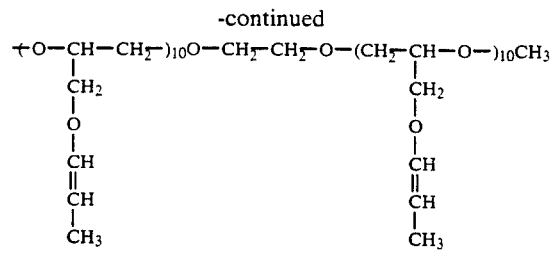

EXAMPLE 8

To a stirred vessel are added 470.4 g (0.7 moles) of a compound which, according to ¹H-NMR, has the average formula

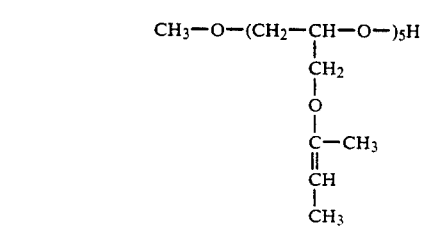

and 23 g of potassium fluoride (1% by weight) and 1584 g (0.1 moles) of a siloxane having the average formula

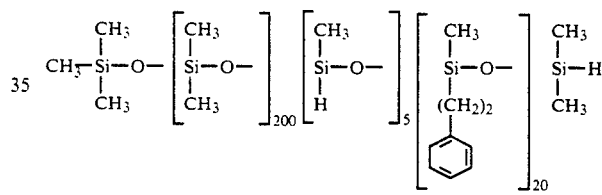

are added dropwise at 120° C. over a period of 2 hours. The reaction mixture is stirred at 100° C. with a solution of 5% sodium butylate in butanol until hydrogen is no longer evolved. The product is distilled under reduced pressure up to 100° C. A total of 2090 g (90% of the theoretical yield) of a slightly yellowish, moderately viscous product are obtained which, according to ¹H-NMR, has the average formula

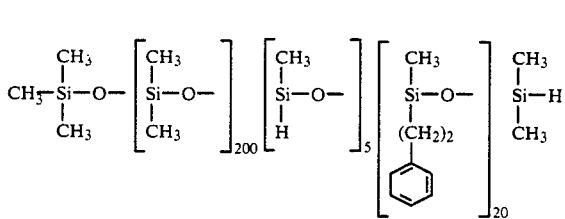

with R² = 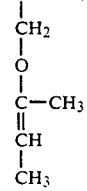

EXAMPLE 9

To a stirred vessel are added 547 g (0.5 moles) of a compound which, according to $^1$H-NMR, has the average formula

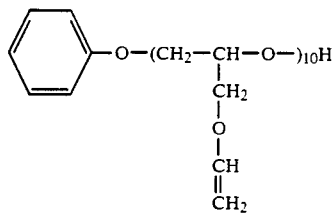

and 23 g of potassium fluoride (1% by weight) and 1584 g (0.1 moles) of a siloxane having the average formula

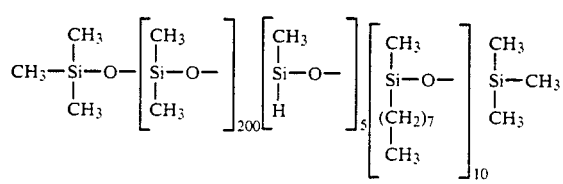

are added dropwise at 120° C. over a period of 2 hours. The reaction mixture is stirred at 100° C. with a solution of 5% sodium butylate in butanol until hydrogen is no longer evolved. The product is distilled under reduced pressure up to 100° C. A total of 2135 g (95% of the theoretical yield) of a slightly yellowish, moderately viscous product are obtained which, according to $^1$H-NMR, has the average formula

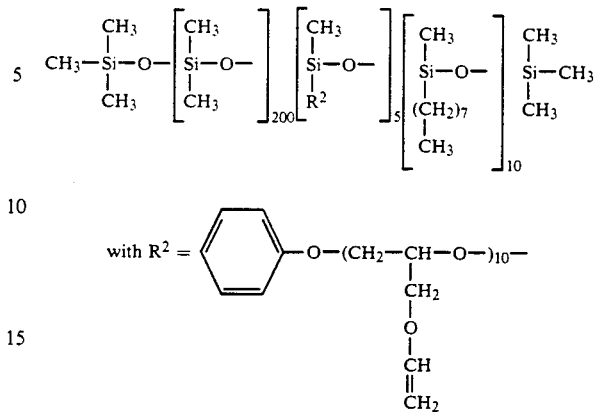

with $R^2 =$

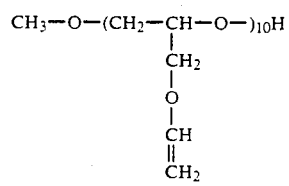

EXAMPLE 10

To a stirred vessel are added 2064 g (2 moles) of a compound which, according to $^1$H-NMR, has the average formula CH$_3$—O—(CH$_2$—CH—O—)$_{10}$H
            |
            CH$_2$
            |
            O
            |
            CH
            ‖
            CH$_2$ and 52 g of potassium fluoride (1% by weight) and 3126 g (0.1 moles) of a siloxane having the average formula

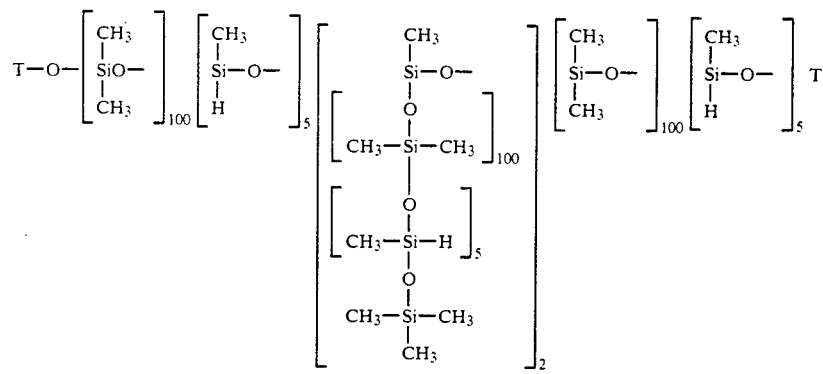

T = (CH$_3$)$_3$Si— are added dropwise at 120° C. over a period of 2 hours. The reaction mixture is stirred at 100° C. until hydrogen is no longer evolved with a solution of 5% sodium butylate in butanol. The product is distilled under reduced pressure up to 100° C. A total of 4512 g (90% of the theoretical yield) of a slightly yellowish, moderately viscous product are obtained which, according to $^1$H-NMR, has the average formula

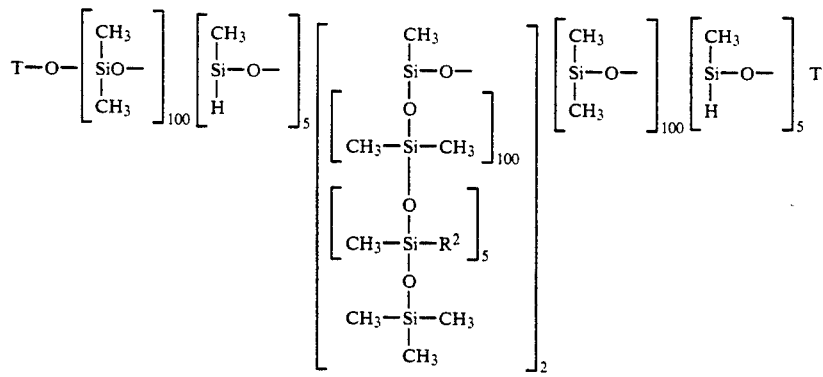

T = (CH₃)₃Si— with R² = CH₃—O—(CH₂—CH—O—)₁₀—
                    |
                    CH₂
                    |
                    O
                    |
                    CH
                    ‖
                    CH₂

Testing Compositions of the Invention

To check the application properties of the polysiloxanes modified according to the invention, the products of examples 1 to 10 are mixed well with 2% by weight of bis(dodecylphenyl) iodonium hexafluoroantimonate and applied on different two-dimensional supports (oriented polypropylene film, calendered paper). Curing is accomplished by means of a UV lamp of Fusion Systems Corporation, Rockville, MD, USA, Model I 300 B, at a sheet speed of 25 m/min. and a distance of 53 mm in normal air of the environment. The amount applied in each case is about 1.1 g/m².

Different 30 mm wide adhesive tapes were used for the comparison experiments, namely adhesive tapes coated with acrylate adhesives, which are obtainable commercially under the names of Tesa® 154 and Tesa® 970.

To measure the abhesiveness, these adhesive tapes are rolled onto the substrate and subsequently stored at 70° C. The force, which is required to pull the adhesive tape from the substrate at a peel angle of 180°, is measured after 24 hours. This force is referred to as the release force. In addition, the adhesion of the modified polysiloxanes is tested by vigorous rubbing with the thumb. If the adhesion is wanting, rubber crumbs are formed. This is the so-called rub-off test.

In a further series of tests, the photoinitiator, bis(dodecylphenyl) iodonium hexafluoroantimonate is replaced by 2% by weight of 2-methyl-2-(4-methylphenylsulfonyl)-4-dodecylphenylpropiophenone. The application is tested as in the first series of tests. The values are given in parenthesis.

TABLE 2

| Modified Siloxane of Example | Calendered Paper | | | Oriented Polypropylene Film | | |
|---|---|---|---|---|---|---|
| | Tesa® 154 | Tesa® 970 | Rub off | Tesa® 154 | Tesa® 970 | Rub off |
| | Release Force (N) | | | Release Force (N) | | |
| 1 | 6 (5) | 10 (9) | n | 5 (5) | 10 (9) | n |
| 2 | 0.6 (0.6) | 1.3 (1.4) | n | 0.5 (0.5) | 1.3 (1.4) | n |
| 3 | 5 (4) | 8 (8) | n | 4 (4) | 8 (8) | n |
| 4 | 1 (1) | 3 (3) | j | 1 (1) | 3 (3) | j |
| 5 | 2 (2) | 3 (3) | n | 2 (2) | 2.5 (3) | n |
| 6 | 0.5 (0.5) | 1.5 (2) | n | 0.5 (0.5) | 1.3 (2) | n |
| 7 | 3 (2) | 4 (5) | n | 3 (3) | 5 (5) | n |
| 8 | 6 (6) | 10 (9) | n | 6 (5) | 9 (9) | n |
| 9 | 4 (5) | 8 (8) | n | 4 (4) | 8 (8) | n |
| 10 | 0.5 (0.5) | 2 (2) | n | 0.5 (0.5) | 1.5 (2) | n |

We claim:

1. A curable organopolysiloxane, which contains oxyalkylene ether groups linked through SiOC groups and has the average formula

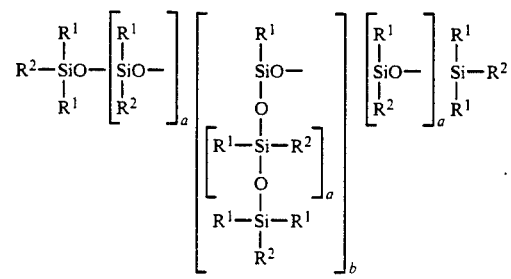

wherein

R¹ is the same or different in the molecule and represent an alkyl group with 1 to 4 carbon atoms or a phenyl group, with the proviso that at least 90% of the R¹ groups are methyl groups R² is the same or different in the molecule and represents an alkyl group with 1 to 20 carbon atoms, an aryl group, aralkyl group or an oxyalkylene ether group of the formula

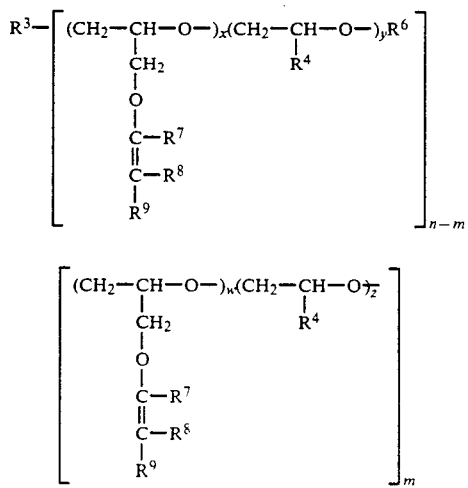

wherein
R³ is an n-valent group derived from a compound (R³)H$_n$ with n active hydrogen atoms, the compound (R³)H$_n$ is selected from a member of the group consisting of water, ammonia, a monohydric and polyhydric alcohol, a monohydric or polyhydric phenol, a monocarboxylic or polycarboxylic acid, a hydrocarboxylic acid, a monoamine or a polyamine,
R⁴ is a hydrogen, hydrocarbon or R⁵OCH₂— group,
R⁵ is a hydrogen, hydrocarbon or acyl group,
R⁶ is a hydrocarbon or acyl group,
R⁷, R⁸, R⁹ are each a hydrogen or hydrocarbon group with 1 to 8 carbon atoms or
R⁷ and R⁸ or R⁸ and R⁹ can be linked together to form a cyclic, nonaromatic hydrocarbon group with 5 or 6 carbon atoms,
n is a number from 1 to 6,
m has an average value of 1 to 2, provided m≯n,
x, y, w, z each have a value of 0 to 100, with the proviso that w+z≧1 and the sum [x(n−m)+w.m] is >1, with the further proviso that in the average molecule at least one R² group is an oxyalkylene ether group as defined above,
a has an average value of 1 to 1,000 and
b has an average value of 0 to 10.

2. The organopolysiloxane of claim 1, which contains 1 to 30 oxyalkylene ether groups R² in the average organopolysiloxane molecule.

3. The organopolysiloxane of claim 1, in which a has a value of 5 to 200 and b has a value of 0 to 2.

4. The organopolysiloxane of claim 3, in which b has a value of 0.

5. The organopolysiloxane of claim 1, in which at least one of the R⁷, R⁸ and R⁹ groups is an alkyl group.

6. The organopolysiloxane of claim 5, in which at least one group selected from the R⁸ group and the R⁹ group is an alkyl group and the R⁷ group is a hydrogen group.

7. The organopolysiloxane of claim 5, in which the R⁹ group is a methyl group and the R⁷ and R⁸ groups are hydrogen groups.

8. The organopolysiloxane of claim 1, in which R⁷ and R⁸ can be linked together to form a cyclic, non-aromatic hydrocarbon group with 5 or 6 carbon atoms and R⁹ is a hydrogen group.

9. The organopolysiloxane of claim 1, in which

1<x+y+w+z<150.

10. The organopolysiloxane of claim 1, in which x+w has a value of 1 to 25.

11. The organopolysiloxane of claim 10, in which x+w has a value of 2 to 4.

12. The organopolysiloxane of claim 1, in which m=1.

13. The organopolysiloxane of claim 1, in which the compound (R³)H$_n$, from which the R³ group is derived, is a monohydric, saturated, aliphatic alcohol with 1 to 13 carbon atoms.

14. The organopolysiloxane of claim 1, in which the compound (R³)H$_n$, from which the R³ group is derived, is a monohydric, unsaturated, aliphatic alcohol with 1 to 13 carbon atoms.

15. The organopolysiloxane of claim 1, in which the compound (R³)H$_n$, from which the R³ group is derived, is a dihydric to hexahydric aliphatic alcohol with 2 to 6 carbon atoms.

16. The organopolysiloxane of claim 1, in which R⁴ is a hydrogen, methyl, ethyl, HOCH₂— or CH₃OCH₂— group.

17. A method for the synthesis of the organopolysiloxanes defined in claim 1, which comprises reacting a polyoxyalkylene ether with an organopolysiloxane, optionally in the presence of a solvent at a temperature of 25° C. to 170° C., wherein the polyoxyalkylene ether is of the formula

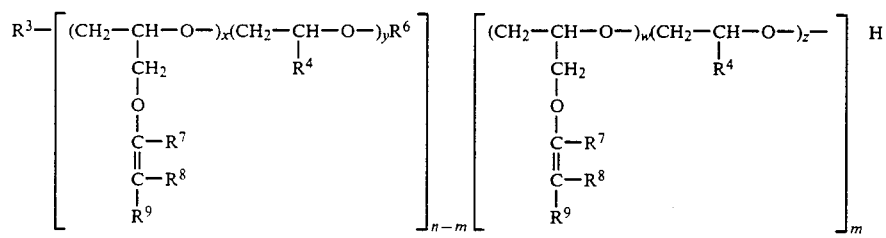

wherein R³, R⁴, R⁵, R⁶, R⁷, R⁸, R⁹, n, m, x, y, w and z have the meanings or values already given, and the organopolysiloxane is of the average formula

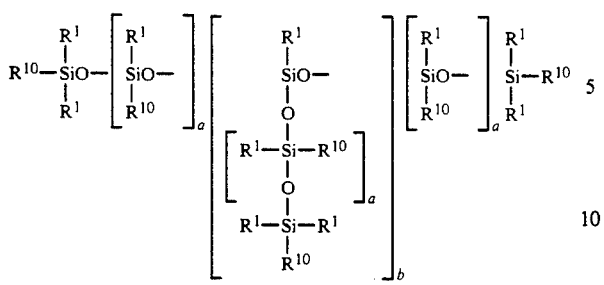

wherein
$R^1$, a and b have the same meanings or values already given and the groups
$R^{10}$ are the same or different and represent alkyl groups with 1 to 20 carbon atoms, aryl groups, aralkyl groups or reactive groups, which react with —COH groups with the formation of SiOC groups selected from a member of the group consisting of —OH, —OR$^{11}$, —Cl, —H and OCOR$^{12}$, wherein $R^{11}$ and $R^{12}$ are alkyl groups with 1 to 4 carbon atoms,
with the proviso that in the average molecule at least one $R^{10}$ group is a reactive group.

18. A casting composition comprising a curable polysiloxane of claim 1.

19. A casting composition comprising a photochemically curable organopolysiloxane of claim 1.

20. A coating material for a two-dimensional support comprising an organopolysiloxane of claim 1.

21. A modifying additive for a compound which can be cured by free radicals, cationically or by UV or electron beam radiation comprising an organopolysiloxane of claim 1.

* * * * *